United States Patent Office 3,629,474
Patented Dec. 21, 1971

3,629,474
INSECTICIDAL AND FUNGICIDAL COMPOSITIONS AND METHODS OF COMBATING FUNGI AND INSECTS USING ISOXAZOLYL CARBAMATES
Ranajit Ghosh and Nigel Douglas Bishop, Bracknell, England, assignors to Imperial Chemical Industries Limited, London, England
No Drawing. Filed Nov. 26, 1968, Ser. No. 779,223
Claims priority, application Great Britain, Dec. 4, 1967, 55,058/67; Feb. 20, 1968, 8,259/68
Int. Cl. A01n 9/22, 9/28
U.S. Cl. 424—272
5 Claims

ABSTRACT OF THE DISCLOSURE

Isoxazolyl carbamates and pesticidal compositions containing them. A typical carbamate is 4,5-dimethyl-3-isoxazolyl dimethylcarbamate.

This invention relates to new organic compounds, processes for preparing them and compositions containing them. More particularly this invention relates to new isoxazolyl carbamates and pesticidal compositions containing them.

According to the present invention we provide new isoxazolyl carbamates having the formula:

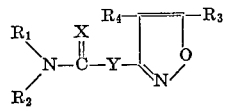

(I)

or having the formula:

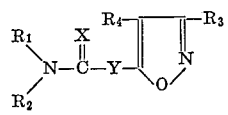

(II)

wherein X and Y are atoms of oxygen or sulphur; $R_1$ and $R_2$ are hydrocarbon groups, or $R_1$ and $R_2$ together with the adjacent nitrogen atom form a heterocyclic ring, or, in Formula I above above $R_1$ is hydrogen and $R_2$ is a hydrocarbon group; and $R_3$ and $R_4$ are hydrogen or hydrocarbon groups, or $R_3$ and $R_4$ together form a homocyclic or heterocyclic bridging group.

Compounds within the invention include those as defined above and wherein $R_1$, $R_2$, $R_3$ and $R_4$ are hydrogen atoms, alkyl, alkenyl, aryl or aralkyl groups, for example methyl or ethyl groups, and both X and Y are atoms of oxygen.

Specific compounds according to the invention are, for example, those set out below in Tables 1 and 2. All the compounds specified in Table 1 are believed to have a structure represented by the general Formula I above, whilst those specified in Table 2 are believed to have a structure represented by the general Formula II above.

TABLE 1

| Compound number | Structural formula |
|---|---|
| 1 | $(CH_3)_2N\text{-}C(=O)\text{-}O\text{-}[\text{isoxazolyl-}3,5\text{-}(CH_3)_2]$ |
| 2 | $CH_3(CH_3)N\text{-}C(=O)\text{-}O\text{-}[\text{isoxazolyl with }CH_2CH_3, CH_3]$ |
| 3 | $CH_2NH\text{-}C(=O)\text{-}O\text{-}[\text{isoxazolyl with }CH_3, CH_3]$ |
| 4 | $CH_3NH\text{-}C(=O)\text{-}O\text{-}[\text{isoxazolyl with }CH_2CH_3, CH_3]$ |
| 5 | $C_6H_5\text{-}NH\text{-}C(=O)\text{-}O\text{-}[\text{isoxazolyl with }CH_3, CH_3]$ |
| 6 | $C_6H_5\text{-}NH\text{-}C(=O)\text{-}O\text{-}[\text{isoxazolyl with }CH_2CH_3, CH_3]$ |

TABLE 2

| Compound number | Structural formula |
|---|---|
| 7 | $(CH_3)_2N\text{-}C(=O)\text{-}O\text{-}[\text{isoxazole with }CH_3, CH_3]$ |
| 8 | $(CH_3)_2N\text{-}C(=O)\text{-}O\text{-}[\text{isoxazole with }CH_2CH_2CH_3, CH_3]$ |
| 9 | $(CH_3)_2N\text{-}C(=O)\text{-}O\text{-}[\text{isoxazole with }CH_2CH_2CH_2CH_3, CH_3]$ |
| 10 | $(CH_3)_2N\text{-}C(=O)\text{-}O\text{-}[\text{isoxazole with }CH_2CH_2CH(CH_3)_2, CH_3]$ |
| 11 | $(CH_3)_2N\text{-}C(=O)\text{-}O\text{-}[\text{isoxazole with }CH_2\text{-}CH=CH_2, CH_3]$ |
| 12 | $(CH_3)_2N\text{-}C(=O)\text{-}O\text{-}[\text{isoxazole with }CH_2C_6H_5, CH_3]$ |
| 13 | $(CH_3)_2N\text{-}C(=O)\text{-}O\text{-}[\text{fused cyclohexane-isoxazole}]$ |
| 14 | $(CH_3)_2N\text{-}C(=O)\text{-}O\text{-}[\text{isoxazole with }CH_3, CH_3]$ |

Particularly useful compounds are No. 1 of Table 1 and No. 7 of Table 2.

The compounds of this invention can be obtained by a number of different methods. According to a further feature of this invention we provide a process for the preparation of compounds of this invention, which comprises reacting a compound of the formula:

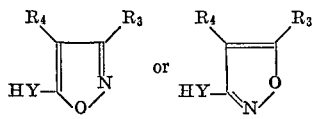

wherein $R_3$, $R_4$ and Y have any of the meanings stated above, with a carbamoyl halide of the formula:

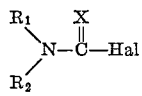

wherein $R_1$, $R_2$ and X have any of the meanings stated above, and Hal represents a halogen atom, conveniently under conditions where the hydrogen halide which is formed in the reaction is removed as it is produced. A suitable method for removing the acid comprises carrying out the reaction in the presence of an acid acceptor, for example a base or a salt of a strong base and a weak acid. Various bases can be used for the purpose, for example alkali and alkaline earth metal hydroxides, aliphatic tertiary amines, and heterocyclic substances containing a nitrogen hetero-atom, for example pyridine. If excess pyridine is used it will act as a solvent medium for the reaction. In general, salts of strong bases and weak acids are preferred, particularly alkali and alkaline earth metal carbonates, for example potassium carbonate. The reactions can be carried out either in the presence or absence of a diluent, for example an organic solvent, at ambient or elevated temperatures. The reactions usually take place more readily at slightly elevated temperatures, for example from 10° C. to 80° C. and preferably from 20° C. to 60° C. in the presence of an organic solvent, for example acetone. When a solvent is present the temperature at which the reaction is carried out is then determined by the boiling point of the solvent under the conditions in which it is used. The times taken for the reactions to achieve completion vary according to the nature of the reactants and the temperatures at which the reactions are carried out. In general, however, when temperatures of from 10° C. to 80° C. are employed the reactions are usually complete within a period of from 1 to 50 hours.

According to a further feature of the invention we provide a process for the preparation of those compounds of the invention corresponding to the general Formula I above which comprises reacting a compound of the formula:

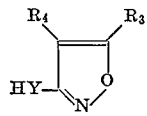

wherein $R_3$, $R_4$ and Y have any of the meanings stated above, an isocyanate or isothiocyanate of the formula $R_2NCX$, wherein $R_2$ and X have any of the meanings stated above.

This reaction may be carried out in a diluent or solvent, for example benzene, and it may be accelerated by the presence of a catalytic amount of a base and/or the application of heat.

The compounds of this invention are very toxic towards a variety of insect pests including the following:

*Tetranychus telarius* (red spider mites)
*Aphis fabae* (black aphids)
*Megoura viciae* (green aphids)
*Musca domestica* (houseflies)
*Meloidogyne incognita* (nematodes)
*Aedes aegypti* (mosquitos)

The compounds of this invention also exhibit fungicidal properties and are active against the following diseases in particular:

*Podosphaera leucotricha* (apple powdery mildew)
*Plasmopara viticola* (vine downy mildew)
*Sphaerotheca fuliginea* (cucumber powdery mildew)
*Puccinia recondita* (wheat rust)
*Piricularia oryzae* (rice blast)

A particularly useful feature of the activity of the invention compounds is their ability to act individually as systemic pesticides, that is to say, their ability to move in a plant to combat an infestation or infestation thereon remote from a site of initial application of a compound. Thus a compound of the invention, or a composition containing the same, may be applied to the soil surrounding the roots of a plant and taken up by the plant through its roots to combat pests on the plant.

The invention further consists in pesticidal compositions comprising as an active ingredient a compound having the formula:

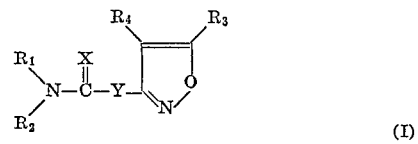

(I)

or having the formula:

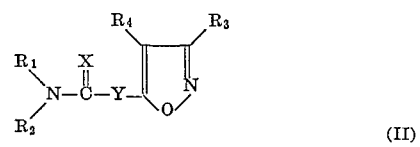

(II)

wherein X and Y are atoms of oxygen or sulphur; $R_1$ and $R_2$ are hydrocarbon groups, or $R_1$ and $R_2$ together with the adjacent nitrogen atom form a heterocyclic ring, or, in Formula I above $R_1$ is hydrogen and $R_2$ is a hydrocarbon group; and $R_3$ and $R_4$ are hydrogen or hydrocarbon groups, or $R_3$ and $R_4$ together form a homocyclic or heterocyclic bridging group.

Conveniently the compositions of the invention comprise as an active ingredient a compound as defined above and in which $R_1$, $R_2$, $R_3$ and $R_4$ are hydrogen atoms, alkyl, alkenyl, aryl or aralkyl groups, for example methyl or ethyl groups, and X and Y are both atoms of oxygen.

Specific compounds useful as an active ingredient in the compositions of this invention are those numbered 1 to 14 in Tables 1 and 2 and the compound of Example 15.

In use, the invention compounds, or compositions containing them, may be applied in a variety of ways. Thus their application can suitably be directed onto the foliage of the plant or to infected and/or infested areas thereof; alternatively the soil surrounding the plant can be treated with the invention compounds or compositions containing them. If desired the seeds themselves can be similarly treated.

According to a further feature therefore we provide a method of combating undesired pests on plants which comprises applying to the locus of the plant an isoxazolyl carbamate compound, or composition containing the same, as hereinbefore defined.

In a further aspect the invention provides a method of combating pests on plants which comprises applying to the plants or to seeds thereof an isoxazolyl carbamate compound or composition as hereinbefore defined. The invention further includes a method of treating agricultural soil which comprises applying to the soil an isoxazolyl carbamate compound or a composition as hereinbefore defined.

In a yet further aspect the invention includes a method of combating pests which comprises applying to the pests or to a pest habitat an isoxazolyl carbamate compound or composition as hereinbefore defined.

The compounds and compositions of the invention may be used for agricultural or horiticultural purposes and the compound or type of composition used in any instance will depend upon the particular purpose for which it is to be used.

Compositions comprising the invention compounds may be in the form of dusting powders or granules wherein the active ingredients is mixed with a solid diluent or carrier. Suitable solid diluents or carriers may be, for example, kaolin, bentonite, kieselguhr, dolomite, calcium carbonate, talc, powdered magnesia, fuller's earth, gypsum, hewitt's earth, diatomaceous earth and China clay. Compositions for dressing seed, for example, may comprise an agent assisting the adhesion of the composition to the seed, for example, a mineral oil.

The composition may also be in the form of dispersible powders or grains comprising, in addition to the active ingredient, a wetting agent to facilitate the dispersion of the powder or grains in liquids. Such powders or grains may include fillers, suspending agents and the like.

The compositions may also be in the form of liquid preparations to be used as dips or sprays which are generally aqueous dispersions or emulsions containing the active ingredient in the presence of one or more wetting agents, dispersing agents, emulsifying agents or suspending agents.

Wetting agents, dispersing agents and emulsifying agents may be of the cationic, anionic, or non-ionic type. Suitable agents of the cationic type include, for example, quaternary ammonium compounds, for example, cetyltrimethylammonium bromide. Suitable agents of the anionic type include, for example, soaps, salts of aliphatic monoesters of sulphuric acid, for example sodium lauryl sulphate, salts of sulphonated aromatic compounds, for example sodium dodecylbenzenesulphonate, sodium, calcium or ammonium lignosulphonate, butylnaphthalene sulphonate, and a mixture of the sodium salts of diisopropyl- and triisopropylnaphthalene sulphonic acids.

Suitable agents of the non-ionic type include, for example, the condensation products of ethylene oxide with fatty alcohols such as oleyl alcohol or cetyl alcohol, or with alkyl phenols such as octylphenol, nonylpheno and octylcresol. Other non-ionic agents are the partial esters derived from long chain fatty acids and hexitol anhydrides, the condensation products of the said partial esters with ethylene oxide, and the lecithins.

Suitable suspending agents are, for example, hydrophilic colloids, for example polyvinylpyrrolidone and sodium carboxymethyl-cellulose, and the vegetable gums, for example gum acacia and gum tragacanth.

The aqueous solutions dispersions or emulsions may be prepared by dissolving the active ingredient or ingredients in an organic solvent which may contain one or more wetting, dispersing or emulsifying agents and then adding the mixture so obtained to water which may likewise contain one or more wetting, dispersing or emulsifying agents. Suitable organic solvents are ethylene dichloride, isopropyl alcohol, propylene glycol, diacetone alcohol, toluene, kerosene, methylnaphthalene, xylenes and trichloroethylene.

The isoxazolyl carbamates of the invention may also be formulated into compositions comprising capsules or microcapsules containing either the active ingredient itself, or a composition containing the active ingredient, and prepared by any of the known encapsulation or microencapsulation techniques.

The compositions to be used as sprays may also be in the form of aerosols wherein the formulation is held in a container under pressure in the presence of a propellant such as fluorotrichlormethane or dichlordifluoromethane.

By the inclusion of suitable additives, for example, for improving the distribution, adhesive, powder and resistance to rain on treated surfaces, the different compositions can be better adapted for the various uses for which they are intended.

The compounds of this invention may also be conveniently formulated by admixing them with fertilizers. A preferred composition of this type comprises granules of fertilizer material incorporating, for example coated with, an isoxazolyl carbamate derivative of the invention. The fertilizer material may, for example, comprise nitrogen or phosphate-containing substances.

In yet a further aspect of the invention, therefore, we provide a fertilizer comprising an isoxazolyl carbamate compound as hereinbefore defined.

The compositions which are to be used in the form of aqueous dispersions or emulsions are generally supplied in the form of a concentrate containing a high proportion of the active ingredient or ingredients, the said concentrate to be diluted with water before use.

These concentrates are often required to withstand storage for prolonged periods and after such storage, to be capable of dilution with water in order to form aqueous preparations which remain homogeneous for a sufficient time to enable them to be applied by conventional spray equipment. The concentrates may conveniently contain from 10–85% by weight of the active ingredient or ingredients and generally from 25–60% by weight of the active ingredient or ingredients. When diluted to form aqueous preparations, such preparations may contain varying amounts of the active ingredient or ingredients depending upon the purpose for which they are to be used, but an aqueous preparation containing between 0.001% and 1.0% by weight of active ingredient or ingredients may be used.

It is to be understood that the pesticidal compositions of this invention may comprise, in addition to an isoxazolyl carbamate compound of the invention, one or more other compounds having biological activity.

The invention is illustrated, but not limited, by the following examples.

EXAMPLE 1

This example illustrates the preparation of 4,5-dimethyl-3-isoxazolyl dimethylcarbamate, having the structure:

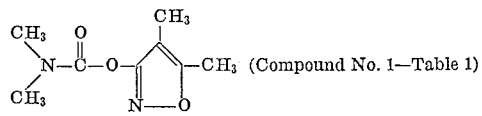

A mixture of 4,5-dimethyl-3-isoxazolone (5.0 g.) and dimethylcarbamoyl chloride (3.0 cc.) in pyridine (50 cc.) was kept under a nitrogen atmosphere for 48 hours with occasional shaking, at the end of which time the pyridine was removed by evaporation under reduced pressure. The residual mixture was distributed between water and methylene chloride, and the organic layer separated, washed with water, 5% aqueous sodium hydroxide solution, and finally with water. After drying the methylene chloride layer over anhydrous sodium sulphate, the solvent was removed by evaporation under reduced pressure and the residual oil distilled to yield, 4,5-dimethyl-3-isoxazolyl dimethylcarbamate, colourless oil, B.P. 115–117° C. at 0.03 mm. Hg, $n_D 24.5° = 1.4742$, which solidified on keeping to a white solid, M.P. 45–46° C.

EXAMPLE 2

This example illustrates the preparation of 4-ethyl-5-methyl-3-isoxazolyl dimethylcarbamate, having the structure:

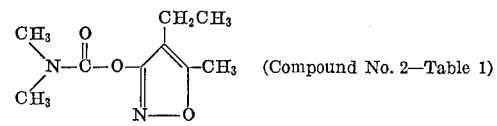

The procedure of Example 1 was followed, except that 4-ethyl-5-methyl-3-isoxazolone (1.6 g.) was used with dimethylcarbamoyl chloride (1.5 cc.). 4-ethyl-5-methyl-3-isoxazolyl dimethylcarbamate was obtained as a colourless oil, B.P. 75–84° C. at 0.03 mm. Hg.

EXAMPLE 3

This example illustrates the preparation of 4,5-dimethyl 3-isoxazolyl N-methylcarbamate, having the structure:

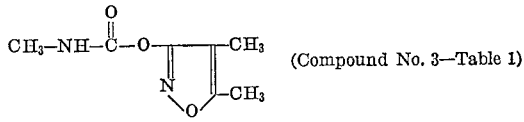

(Compound No. 3—Table 1)

A mixture of 4,5-dimethyl-3-isoxazolone (3.0 g.), methyl isocyanate (1.7 g.) N-methyl morpholine (0.01 cc.) and ether (25 cc.) was allowed to stand at room temperature for 20 hours. The crystalline precipitate was collected by filtration and recrystallised from a petroleum ether (boiling range 60–80° C.) and ethanol mixture to yield 4,5-dimethyl-3-isoxazolyl N-methylcarbamate, having a melting point of 98° C.

EXAMPLE 4

This example illustrates the preparation of 4-ethyl-5-methyl-3-isoxazolyl N-methylcarbamate having the structure:

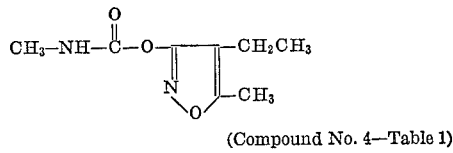

(Compound No. 4—Table 1)

The procedure of Example 3 was followed except that 4-ethyl-5-methyl-3-isoxazolone was used in place of 4,5-dimethyl-3-isoxazolone. 4-ethyl-5-methyl-3-isoxazolyl N-methyl-carbamate was obtained as a white crystalline solid, M.P. 96.5° C., after recrystallisation from a petroleum ether-ethanol mixture.

EXAMPLE 5

This example illustrates the preparation of 4,5-dimethyl-3-isoxazolyl N-phenylcarbamate, having the structure:

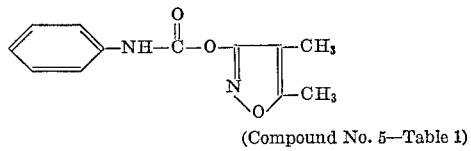

(Compound No. 5—Table 1)

The procedure of Example 3 was followed except that phenylisocyanate was used in place of methylisocyanate. 4,5-dimethyl-3-isoxazolyl N-phenylcarbamate was obtained as a white crystalline solid having a melting point of 114° C. after recrystallisation from a petroleum ether-ethanol mixture.

EXAMPLE 6

This example illustrates the preparation of 4-ethyl-5-methyl-3-isoxazolyl N-phenylcarbamate having the structure:

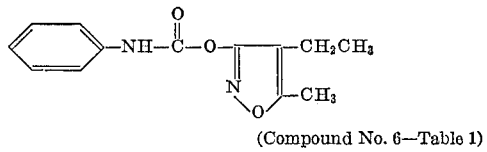

(Compound No. 6—Table 1)

The procedure of Example 4 was followed except that phenylisocyanate was used in place of methylisocyanate. 4-ethyl-5-methyl-3-isoxazolyl N-phenylcarbamate was obtained as a white crystalline solid having a melting point of 84° C. after repeated crystallisation from a petroleum ether-ethanol mixture.

EXAMPLE 7

This example illustrates the preparation of 3-methyl-5-isoxazolyl N,N-dimethylcarbamate having the structure:

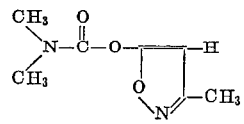

(Compound No. 7—Table 2)

A mixture of 3-methyl-5-isoxazolone (10.0 g.), anhydrous potassium carbonate (13.8 g.), dimethylcarbamoyl chloride (13.4 g.) and ethyl acetate (150 cc.) was refluxed under an atmosphere of nitrogen for a period of 6 hours. After removing the insoluble portion by filtration, the solvent was evaporated under reduced pressure. The residual oil was then held at a temperature of 30° C. and at a pressure of 0.01 mm. Hg for a period of 2 hours to remove any volatile materials, 3-methyl-5-isoxazolyl N,N-dimethylcarbamate remaining as a viscous oil, its identity being confirmed by infra-red spectroscopy ($\nu_{CO}$–1735 cm.$^{-1}$) and elemental analysis. Found (percent): C, 49.2; H, 5.96; N, 16.1. $C_7H_{10}N_2O_3$ requires (percent): C, 49.4; H, 5.88; N, 16.5.

EXAMPLE 8

This example illustrates the preparation of 3-methyl-4-n-propyl-5-isoxazolyl N,N - dimethylcarbamate having the structure:

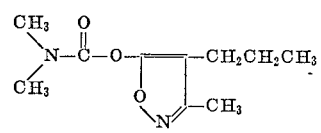

(Compound No. 8—Table 2)

A mixture of 3-methyl-4-n-propyl-5-isoxazolone (8.0 g.) dimethylcarbamoyl chloride (6 cc.) and pyridine (50 cc.) was stood at room temperature for 16 hours, then refluxed for a period of 3 hours, after which the pyridine was removed by evaporation at reduced pressure. The residue was taken up in methylene chloride and this solution washed successively with water, saturated sodium bicarbonate solution and water, and dried over anhydrous sodium sulphate. After filtering to remove the solid, the solvent was evaporated under reduced pressure and the residue held at 50° C. and 0.01 mm. Hg pressure to remove the volatile impurities. There remained after this treatment, 3-methyl-4-n-propyl - 5 - isoxazolyl N,N-dimethylcarbamate, a viscous oil, having the following elemental analysis: Found (percent): C, 56.8; H, 7.33; N, 13.4. $C_{10}H_{16}N_2O_3$ requires (percent): C, 56.6; H, 7.85; N, 13.2.

EXAMPLE 9

This example illustrates the preparation of 4-n-butyl-3-methyl-5-isoxazolyl N,N-dimethylcarbamate, having the structure:

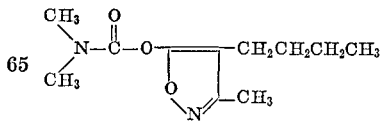

(Compound No. 9—Table 2)

The procedure of Example 8 was followed except that 4-n-butyl-3-methyl - 5 - isoxazolone was used in place of 3-methyl-4-n-propyl-5-isoxazolone. 4-n-butyl - 3 - methyl-5-isoxazolyl N,N-dimethylcarbamate was obtained as a viscous oil, having the following elemental analysis. Found (percent): C, 58.5; H, 8.22; N, 12.2. $C_{11}H_{18}N_2O_3$ requires (percent): C, 58.4; H, 7.97; N, 12.4.

EXAMPLE 10

This example illustrates the preparation of 4-(3-methylbutyl)3-methyl-5-isoxazolyl N,N-dimethylcarbamate having the structure:

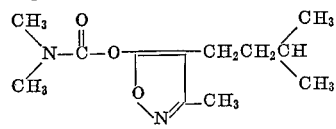

(Compound No. 10—Table 2)

The procedure of Example 8 was followed except that 4-(3-methylbutyl)-3-methyl-5-isoazolone was used in place of 3 - methyl-4-n-propyl isoazolone. 4(3 - methylbutyl) - 3 - methyl - 5 - isoxazolyl N,N - dimethylcarbamate was obtained as a viscous oil having the following elemental analysis. Found (percent): C, 59.5; H, 8.30; N, 11.8. $C_{12}H_{20}N_2O_3$ requires (percent): C, 60.0; H, 8.33; N, 11.7.

EXAMPLE 11

This example illustrates the preparation of 4-allyl-3-methyl-5-isoxazolyl N,N-dimethylcarbamate having the structure:

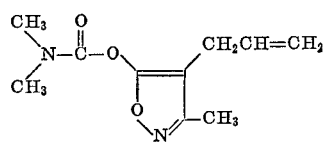

(Compound No. 11—Table 2)

The procedure of Example 8 was followed except that 4-allyl-3-methyl-5-isoxazolone was used in place of 3-methyl-4-n-propyl-5-isoxazolone. 4 - allyl-3-methyl-5-isoxazolyl N,N-dimethylcarbamate was obtained as a viscous oil having the following element analysis. Found (percent): C, 57.7; H, 7.1; N, 12.9. $C_{10}H_{14}N_2O_3$ requires (percent): C, 57.1; H, 6.67; N, 13.3.

EXAMPLE 12

This example illustrates the preparation of 4-benzyl-3-methyl-5-isoxazolyl N,N - dimethylcarbamate having the structure:

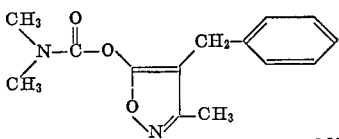

(Compound No. 12—Table 2)

The procedure of Example 8 was followed except that 4-benzyl-3-methyl-5-isoxazolone was used in place of 3-methyl-4-n-propyl - 5 - isoxazolone. 4-benzyl-3-methyl-5-isoxazolyl N,N-dimethylcarbamate was obtained as a viscous oil having the following elemental analysis. Found (percent): C, 64.5; H, 6.08; N, 10.6. $C_{14}H_{16}N_2O_3$ requires (percent): C, 64.6; H, 6.15; N, 10.8.

EXAMPLE 13

This example illustrates the preparation of 4,5,6,7-tetrahydro-3-(2,1 - benzisoxazolyl) N,N-dimethylcarbamate, having the structure:

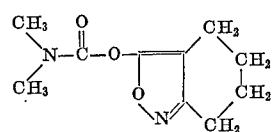

(Compound No. 13—Table 2)

The procedure of Example 8 was followed except that 4,5,6,7-tetrahydro-3-(2,1-benzisoxazolone) was used in place of 3-methyl-4-n-propyl-5-isoxazolone. 4,5,6,7-tetrahydro - 3 - (2,1-benzisoxazolyl) N,N-dimethylcarbamate was obtained as a viscous oil having the following elemental analysis. Found (percent): C, 57.3; H, 6.53; N, 13.0%. $C_{10}H_{14}N_2O_3$ requires (percent): C, 57.1; H, 6.67; N, 13.3%.

EXAMPLE 14

This example illustrates the preparation of 3,4-dimethyl-5-isoxazolyl dimethylcarbamate having the structure:

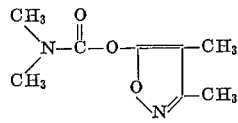

(Compound No. 14—Table 2)

The procedure of Example 7 was followed except that 3,4-dimethyl-5-isoxazolone was used in place of 3-methyl-5-isoxazolone. 3,4-dimethyl-5-isoxazolyl dimethylcarbamate was obtained as a viscous oil, having the following elemental analysis. Found (percent): C, 52.4; H, 6.87; N, 14.8. $C_8H_{12}N_2O_3$ requires (percent): C, 52.1; H, 6.52; N, 15.2.

EXAMPLE 15

This example illustrates the preparation of 3-phenyl-5-isoxazolyl dimethylcarbamate having the structure:

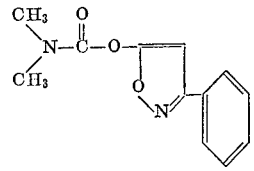

The procedure of Example 7 was followed except that 3-phenyl-5-isoxazolone was used in place of 3-methyl-5-isoxazolone. 3-phenyl-5-isoxazolyl dimethyl-carbamate was obtained as an off-white crystalline solid, M.P. 69° C., after crystallisation from ethanol.

EXAMPLE 16

This example illustrates a concentrate comprising a miscible oil which is readily convertible by dilution with water into a liquid preparation suitable for spraying purposes. The concentrate has the following composition:

| | Percent wt. |
|---|---|
| Compound No. 1 of Table 1 | 25.0 |
| "Lubrol" L (alkylphenol/ethylene oxide condensates; "Lubrol" is a trademark | 2.5 |
| Calcium dodecylbenzenesulphonate | 2.5 |
| "Aromasol" H (alkylbenzene solvent; "Aromasol" is a trademark) | 70.0 |
| | 100.0 |

EXAMPLE 17

This example also illustrates a concentrate which is in the form of a miscible oil. The composition of this concentrate is as follows:

| | Percent wt. |
|---|---|
| Compound No. 7 of Table 2 | 25.0 |
| "Lubrol" L ("Lubrol" is a trademark) | 4.0 |
| Calcium dodecylbenzenesulphonate | 6.0 |
| "Aromasol" H ("Aromasol" is a trademark) | 65.0 |
| | 100.0 |

EXAMPLE 18

This example illustrates a wettable powder having the following composition:

| | Percent wt. |
|---|---|
| Compound No. 1 of Table 1 | 25.0 |
| Sodium silicate | 5.0 |
| Calcium lignosulphonate | 5.0 |
| China clay | 65.0 |
| | 100.0 |

EXAMPLE 19

This example illustrates an atomisable fluid comprising a mixture consisting of 25% by weight of compound No. 7 of Table 2 and 75% by weight of xylene.

EXAMPLE 20

This example illustrates a dusting powder which may be applied directly to plants or other surfaces and comprises 1% by weight of compound No. 1 of Table 1 and 99% by weight of talc.

EXAMPLE 21

25 parts by weight of the product described in Example 1, 65 parts by weight of xylene, and 10 parts of an alkyl aryl polyether alcohol ("Triton" X-100; "Triton" is a trademark) were mixed in a suitable mixer. There was thus obtained an emulsion concentrate which can be mixed with water to produce an emulsion suitable for use in agricultural applications.

EXAMPLE 22

5 parts by weight of the product described in Example 7 were thoroughly mixed in a suitable mixer with 95 parts by weight of talc. There was thus obtained a dusting powder.

EXAMPLE 23

10 parts by weight of the product described in Example 7, 10 parts of an ethylene oxide-octylphenol condensate ("Lissapol" NX; "Lissapol" is a trademark) and 80 parts by weight of diacetone alcohol were thoroughly mixed. There was thus obtained a concentrate which, on mixing with water, gave an aqueous dispersion suitable for application as a spray in the control of insect pests.

EXAMPLE 24

This example illustrates a concentrated liquid formulation in the form of an emulsion. The ingredients listed below were mixed together in the stated proportions and the whole stirred until the constituents were dispersed.

|  | Percent wt. |
|---|---|
| Compound No. 1 (Table 1) | 100 |
| "Lubrol" L ("Lubrol" is a trademark) | 17 |
| Calcium dodecylbenzensulphonate | 3 |
| Ethylene dichloride | 45 |
| "Aromasol" H ("Aromasol" is a trademark) | 15 |
|  | 100 |

EXAMPLE 25

The ingredients listed below were ground together in the proportions stated to produce a powdered mixture readily dispersible in liquids.

|  | Percent wt. |
|---|---|
| Compound No. 1 (Table 1) | 50 |
| "Dispersol" T ("Dispersol" is a trademark) | 5 |
| China clay | 45 |
|  | 100 |

EXAMPLE 26

A composition in the form of grains readily dispersible in a liquid (for example water) was prepared by grinding together the first four of the ingredients listed below in the presence of water and then the sodium acetate was mixed in. The admixture was dried and passed through a British Standard mesh sieve, size 44-100 to obtain the desired size of grains.

|  | Percent wt. |
|---|---|
| Compound No. 1 (Table 1) | 50 |
| "Dispersol" T | 12.5 |
| Calcium lignosulphonate | 5 |
| Sodium dodecylbenzenesulphonate | 12.5 |
| Sodium acetate | 20 |
|  | 100 |

EXAMPLE 27

A composition suitable for use as a seed dressing was prepared by mixing all three of the ingredients set out below in the proportions stated.

|  | Percent wt. |
|---|---|
| Compound No. 7 (Table 2) | 80 |
| Mineral oil | 2 |
| China clay | 18 |
|  | 100 |

EXAMPLE 28

A granular composition was prepared by dissolving the active ingredient in a solvent, spraying the solution obtained onto the granules of pumice and allowing the solvent to evaporate.

|  | Percent wt. |
|---|---|
| Compound No. 7 (Table 2) | 5 |
| Pumice granules | 95 |
|  | 100 |

EXAMPLE 29

An aqueous dispersion formulation was prepared by mixing and grinding the ingredients recited below in the proportions stated.

|  | Percent wt. |
|---|---|
| Compound No. 1 (Table 1) | 40 |
| Calcium lignosulphonate | 10 |
| Water | 50 |
|  | 100 |

The following constitutes an explanation of the compositions or substances represented by the various trademarks and tradenames referred to in the foregoing examples.

"Lubrol" L is a condensate of 1 mole of nonyl phenol with 13 molar proportions of ethylene oxide.

"Aromasol" H is a solvent mixture of alkylbenzenes.

"Dispensol" T is a mixture of sodium sulphate and a condensate of formaldehyde with the sodium salt of naphthalene sulphonic acid.

"Lubrol" APN 5 is a condensate of 1 mole of nonyl phenol with 5½ moles of naphthalene oxide.

"Cellofas" B 600 is a sodium carboxymethyl cellulose thickener.

"Lissapol" NX is a condensate of 1 mole of nonyl phenol with 8 moles of ethylene oxide.

The toxicity of a number of the compounds of this invention towards a variety of insect pests was investigated and the tests conducted and results obtained are set out below. The compounds of the invention were in each case used in the form of a liquid preparation containing 0.1% by weight of the compound. The preparations were made by dissolving each of the compounds in a mixture of solvents consisting of 4 parts by volume of acetone and 1 part by volume of diacetone alcohol. The solutions were then diluted with water containing 0.01% by weight of a wetting agent sold under the trade name of "Lissapol" NX until the liquid preparations contained the required concentration of the compound "Lissapol" is a trademark).

The test procedure adopted with regard to each test insect was basically the same and comprised supporting a number of the insects on some medium which may be a host plant or some foodstuff on which the insect feeds, and treating either or both the insect and the medium with the preparations. The mortality of the insects was then assessed at periods varying from one to three days after the treatment.

The results of the tests are given below in Tables 3 and 4. In these tables the first column indicates the compound used. Each of the subsequent columns indicates the name of the test insect, the host plant or medium on which it was supported, and the number of days which were allowed to elapse after treatment before assessing the percentage of insects which had been killed. The assessment is expressed in integers which range from 0 to 3.

0 represents less than 30% kill
1 represents from 30–49% kill
2 represents from 50–90% kill
3 represents over 90% kill The concentration of the invention compound in the solutions used was 1,000 parts per million for all the pests except in the case of *Meloidogyne incognita* and *Aedes aegypti* when the concentration of the invention compound in the solution used was 100 parts per million.

being present) was applied to the soil surrounding the plant and three days later the plants were inoculated on their new growth with the disease. In the eradicant test, the plants were inoculated with the disease and In the systemic test the solution (without wetting agent of which was assessed visually at the end of the test. then, after a number of days depending on the disease, the leaves were wetted by spraying with a solution or suspension containing 500 parts per million of the active compound and 0.1% of a wetting agent. After a number of days, depending upon the disease, the extent of the disease was assessed visually. The results are shown in

TABLE 3

| Compound Number | *Aphis fabae* Black aphid Broad bean 2 days | *Megoura viciae* Green aphid Broad bean 2 days | *Tetranychus telarius* Red spider mite French bean 3 days | *Musca domestica* House flies Milk and sugar 1 day | *Meloidogyne incognita* Root knot nematode Water 2 days |
|---|---|---|---|---|---|
| 1 | 3 | 3 | 3 | 1 | 3 |
| 2 | 3 | 3 | 2 | 0 | 0 |
| 3 | 3 | 3 | 2 | 3 | 0 |
| 4 | 3 | 3 | 2 | 3 | 0 |

TABLE 4

| Compound Number or Example Number | *Aphis fabea* Black aphid Broad bean 2 days | *Megoura viciae* Green aphid Broad bean 2 days | *Tetranychus telarius* Red spider mite French bean 3 days | *Musca domestica* House flies Milk and sugar 1 day | *Meloidogyne incognita* Root knot nematode Water 2 days | *Aedes aegypti* Mosquito (adults) Water |
|---|---|---|---|---|---|---|
| 7 | 3 | 3 | 3 | 2 | 1 | 1 |
| 8 | 3 | 3 | 2 | 2 | 0 | 0 |
| 9 | 3 | 3 | 0 | 2 | 0 | 0 |
| 10 | 3 | 3 | 2 | 3 | 0 | 0 |
| 11 | 3 | 3 | 2 | 0 | 1 | 1 |
| 12 | 3 | 3 | 0 | 1 | 3 | 0 |
| 13 | 3 | 3 | 3 | 2 | 0 | -- |
| 14 | 3 | 3 | 0 | 0 | 0 | -- |
| 15 | 3 | 0 | 2 | 0 | 3 | 0 |

Compositions according to the invention were made up in the following manner and tested against various fungal diseases, and the results of these tests are shown in Tables 5 and 6 hereinafter. In the tests, a protectant (Prot.), a systemic (Syst.), and an eradicant (Erad.) test were carried out and in the protectant test, the plants were sprayed so that the leaves were wetted, with a solution or suspension containing 500 parts per million of the active compound and 0.1% of a wetting agent, and after 24 hours were inoculated with the disease, the extent Tables 5 and 6 below as a grading giving the percentage amount of disease as follows:

| Grading: | Percentage amount of disease |
|---|---|
| 0 | 61–100 |
| 1 | 26–60 |
| 2 | 6–25 |
| 3 | 0–5 |
| – | (1) |

[1] Signifies that no test was made.

TABLE 5

| Compound Number | *Puccinia recondita* (rust) Wheat 10 days Prot | *Puccinia recondita* (rust) Wheat 10 days Erad | *Sphaerotheca fuliginea* (powdery mildew) Cucumber 10 days Prot | *Sphaerotheca fuliginea* (powdery mildew) Cucumber 10 days Syst | *Plasmopara viticola* (downy mildew) Vine 7 days Prot | *Plasmopara viticola* (downy mildew) Vine 7 days Syst | *Pircularia oryzae* (blast) Rice 7 days Prot | *Pircularia oryzae* (blast) Rice 7 days Syst |
|---|---|---|---|---|---|---|---|---|
| 1 | 0 | 3 | 1 | 1 | 0 | 2 | 0 | 0 |
| 2 | 0 | 0 | 1 | 3 | 0 | 0 | 0 | 0 |
| 5 | 2 | 0 | 0 | 0 | 0 | 0 | 3 | 0 |
| 6 | 3 | 0 | 0 | 0 | 0 | 0 | 0 | 0 |

TABLE 6

| Compound Number or Example Number | Puccinia recondita (rust) Wheat 10 days | | Piricularia oryzae (blast) Rice 7 days | | Plasmopara viticola (downy mildew) Vine 7 days | | Podosphaera leucotricha (powdery mildew) Apple 10-14 days | |
|---|---|---|---|---|---|---|---|---|
| | Prot | Syst | Prot | Syst | Prot | Syst | Prot | Syst |
| 9 | 2 | 0 | 2 | 0 | 0 | 1 | | |
| 11 | 2 | 2 | 0 | 0 | 1 | 1 | | |
| 12 | 3 | 1 | 3 | 0 | 0 | 0 | | |
| 13 | 3 | 0 | 0 | 1 | 1 | 2 | | |
| 14 | 0 | | 0 | 0 | 0 | 0 | 3 | 2 |
| 15 | 3 | 1 | 0 | 0 | 0 | 0 | | |

We claim:

1. An insecticidal and fungicidal composition comprising, as an active ingredient, from 0.0001% to 85% by weight of an isoxazolyl carbamate selected from the group consisting of

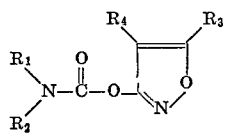

(I)

and

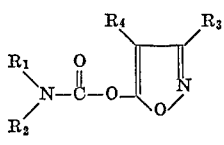

(II)

wherein, $R_1$, $R_2$, $R_3$, and $R_4$ are selected from the group consisting of hydrogen, alkyl of 1-5 carbon atoms, allyl, phenyl and benzyl and in the case of $R_3$ and $R_4$ considered together a tetramethylene group and a pesticide carrier.

2. A composition as claimed in claim 1 wherein the active ingredient is a compound having the formula:

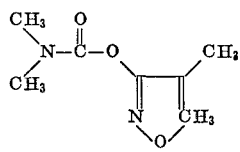

3. A composition as claimed in claim 1 wherein the active ingredient is a compound having the formula:

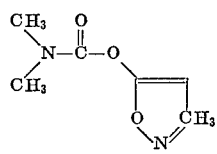

4. A method of combating insect and fungal infestations which comprises applying to the locus subject to such infestations an insecticidally and fungicidally effective amount of an isoxazolyl carbamate selected from the group consisting of

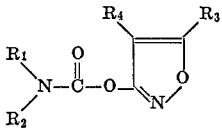

(I)

and

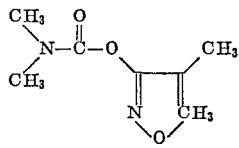

(II)

wherein, $R_1$, $R_2$, $R_3$, and $R_4$ are selected from the group consisting of hydrogen, alkyl of 1-5 carbon atoms, allyl, phenyl and benzyl and in the case of $R_3$ and $R_4$ considered together a tetramethylene group.

5. The method of claim 4 wherein the active ingredient is a compound having the formula:

$$\begin{array}{c}CH_3\\ \diagdown\\ N-C-O\\ \diagup\\ CH_3\end{array}\quad\begin{array}{c}O\\ \|\\ \end{array}\quad\begin{array}{c}CH_3\\ \\ CH_3\\ \\ \end{array}$$

or a compound having the formula:

$$\begin{array}{c}CH_3\\ \diagdown\\ N-C-O\\ \diagup\\ CH_3\end{array}\quad\begin{array}{c}O\\ \|\\ \end{array}\quad\begin{array}{c}\\ CH_3\\ \end{array}$$

References Cited
UNITED STATES PATENTS 3,203,949    8/1965    Hopkins et al.    260—207.1
3,410,860   11/1968    Haber et al.      260—296

ALBERT T. MEYERS, Primary Examiner

A. J. ROBINSON, Assistant Examiner

U.S. Cl. X.R.

260—307